United States Patent
Tuppen et al.

(10) Patent No.: US 8,685,314 B2
(45) Date of Patent: Apr. 1, 2014

(54) METHOD OF JOINING COMPONENTS

(75) Inventors: Stephen Tuppen, Swadlincote (GB); Daniel Clark, Belper (GB)

(73) Assignee: Rolls-Royce PLC, London (GB)

( * ) Notice: Subject to any disclaimer, the term of this patent is extended or adjusted under 35 U.S.C. 154(b) by 170 days.

(21) Appl. No.: 12/844,189

(22) Filed: Jul. 27, 2010

(65) Prior Publication Data

US 2011/0033331 A1 Feb. 10, 2011

(30) Foreign Application Priority Data

Aug. 10, 2009 (GB) .................................. 0913887.6

(51) Int. Cl.
*B22F 7/04* (2006.01)
*B22F 1/00* (2006.01)

(52) U.S. Cl.
USPC ................................................. 419/8; 419/62

(58) Field of Classification Search
USPC ....................................................... 419/8, 62
See application file for complete search history.

(56) References Cited

U.S. PATENT DOCUMENTS

| | | | |
|---|---|---|---|
| 3,860,420 A * | 1/1975 | Nayar ................................ | 419/6 |
| 4,614,296 A | 9/1986 | Lesgourgues | |
| 4,676,843 A | 6/1987 | Nazmy | |
| 5,788,142 A | 8/1998 | Bigay et al. | |
| 5,812,925 A | 9/1998 | Ecer | |
| 6,284,155 B1 * | 9/2001 | Rao ......................... | 252/301.4 R |
| 6,551,551 B1 * | 4/2003 | Gegel et al. ....................... | 419/5 |
| 2004/0169064 A1 | 9/2004 | Rinne et al. | |
| 2008/0199343 A1 | 8/2008 | Rust et al. | |
| 2009/0304463 A1 * | 12/2009 | Dance et al. .................. | 406/122 |
| 2011/0005334 A1 * | 1/2011 | Haynes et al. ............. | 73/861.19 |

FOREIGN PATENT DOCUMENTS

| | | |
|---|---|---|
| JP | A-2005-116612 | 4/2005 |
| WO | WO 2005/123310 A1 | 12/2005 |
| WO | WO 2009/001026 A1 | 12/2008 |

OTHER PUBLICATIONS

British Search Report dated Aug. 26, 2009 for corresponding British Patent Application No. 0913887.6.
Search Report issued in European Patent Application No. 10 17 0933, dated Dec. 2, 2010.

* cited by examiner

*Primary Examiner* — Rebecca Lee
(74) *Attorney, Agent, or Firm* — Oliff PLC

(57) ABSTRACT

First and second components, which may be metallic components, are joined together in a process including introducing a sinterable powder between the components, the powder being retained within a receptacle, displacing the second component towards the first component to compress the powder, and subsequently applying heat and pressure to the powder to form a sintered bond.

23 Claims, 2 Drawing Sheets

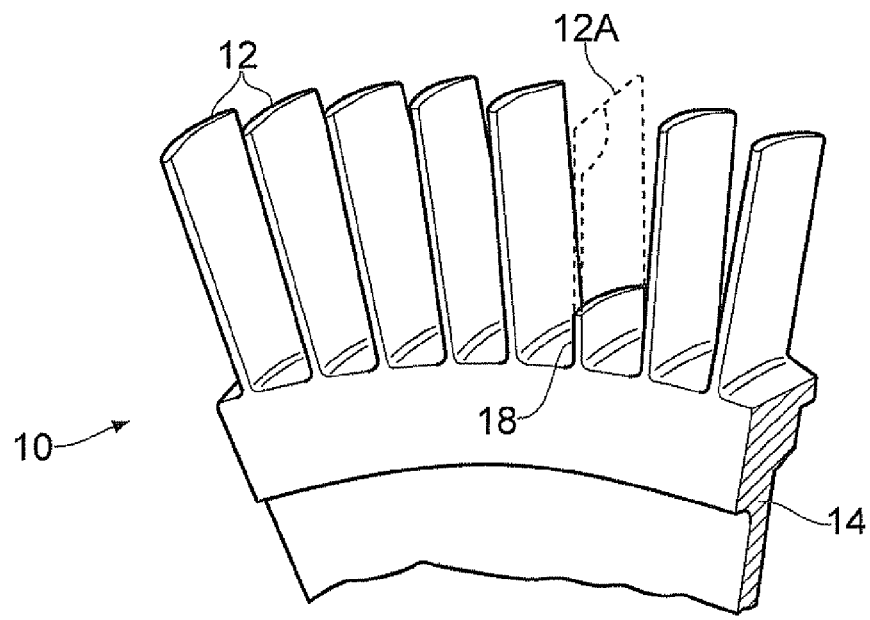
FIG. 1
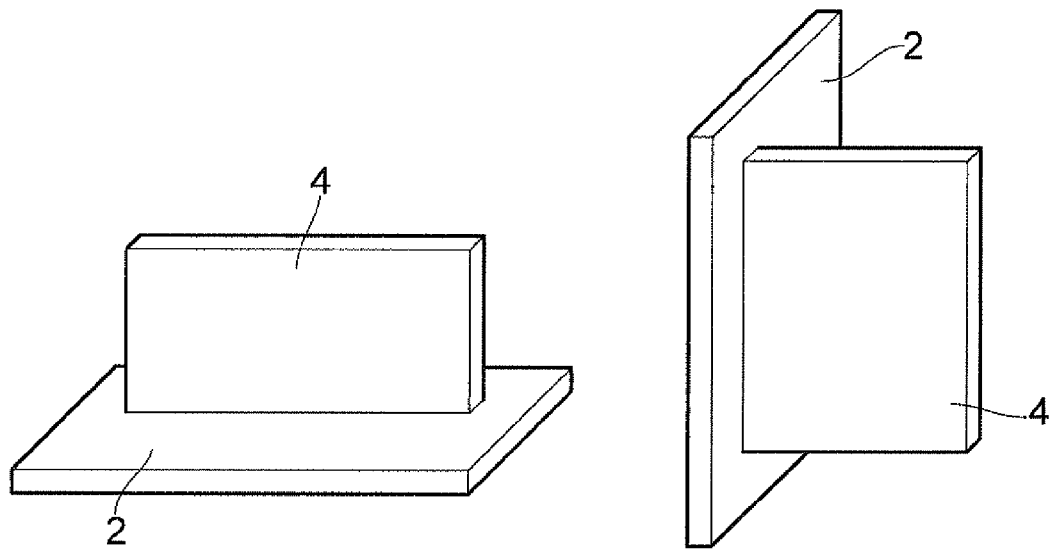
FIG. 2
FIG. 3

METHOD OF JOINING COMPONENTS

BACKGROUND

This invention relates to a method of joining first and second components, and is particularly, although not exclusively, concerned with a method of repairing a structure, such as a bladed disc of a gas turbine engine, by bonding a patch component to the damaged structure.

Compressors and turbines of gas turbine engines such as those used in aero engines typically include a plurality of rotor and stator vane assemblies. The rotor assemblies are designed to impart work into gases passing through the compressor and extract work from the gases passing through the turbine. The stator vane assemblies help to direct the working gases entering or exiting the rotor assemblies and thereby increase efficiency of the engine.

Each rotor assembly includes a disc and a plurality of blades attached to the disc so as to extend radially outwardly therefrom. Conventionally, the blades have been attached to the disc by mechanical connections such as "fir tree" type connections where a fir tree shaped blade root is received within a complementary shaped recess in the disc. This means that the blade can be readily replaced in the event that it is damaged.

Recent developments have resulted in integrally bladed rotor assemblies or "blisks" in which the blades are formed integrally with the disc. These have the advantage of reduced weight as compared to a standard rotor assembly and in improved aerodynamic efficiency. Such blisks are particularly applicable in the design of military aero engines.

In view of the nature of their applications, blisks are susceptible to damage. Blisks of gas turbine engines are high value structures. If a blisk is damaged during the manufacturing process, or during service, it is economically desirable for the damaged blisk to be repaired, rather than scrapped and replaced by an entirely new blisk.

Minor damage can often be rectified by conventional hand dressing and blending processes. However, more substantial damage, for example where more than 20% of an aerofoil volume is damaged or destroyed, repair can be difficult. In some circumstances, the damage may require the replacement of all or part of a blade. In order to replace the blade, it must be removed by machining it off to leave a stub, and fixing a new blade onto the stub by a suitable process.

It is known to remove a damaged aerofoil section and to effect a "patch" repair by joining a repair patch to the remaining part of the original aerofoil. If the joint is made by fusion welding, the resulting joint may have poor mechanical properties resulting from defects and discontinuities in the weld itself. Also, large heat affected zones are created in the repair patch and the original aerofoil part, in which the material properties may be altered.

Repairs have also been effected by using material deposition techniques such as Direct Laser Deposition or shaped metal deposition to regenerate the geometry of damaged components. Such processes are expensive and also result in a heat affected zone.

It has also been proposed, for example in U.S. Pat. No. 5,788,142, to join the metallic parts by means of an intermediate part made from a compatible powdered metal. The intermediate part is placed between the parts to be joined, and subjected to a reaction sintering and consolidation process to form the joint. Such a process requires the separate creation of the intermediate part, and the requirement for accurate alignment of both the parts to be joined and the intermediate part, which is difficult to achieve.

SUMMARY

According to the present invention there is provided a method of joining first and second components comprising:
(a) placing a containment device in contact with the first component so that a faying surface of the first component is exposed to the interior of the containment device;
(b) introducing a sinterable powder into the containment device so that the sinterable powder accumulates on the faying surface of the first component;
(c) fluidising the sinterable powder;
(d) displacing the first and second components relatively to each other to move a faying surface of the second component and the faying surface of the first component towards each other within the containment device, thereby to compress the fluidised powder in a bonding region between the faying surfaces of the first and second components; and
(e) performing a consolidation process on the compressed powder to consolidate the powder in the bonding region to form a joint between the components.

The method may be conducted with at least the faying surfaces disposed in an enclosure which is evacuated or which contains an inert gas during at least steps (b) to (e).

The containment device may conform to the profile of at least one of the components.

After step (b) of the method, the accumulated powder in the containment device may be levelled to provide a powder layer of uniform thickness on the faying surface of the first component. The orientation of the first and second components may be changed after step (b) and before step (d). The orientation of the faying surface of the first component may be changed after step (b) and before step (d). For example, the faying surface of the first component may be substantially horizontal during step (b), and then rotated to a vertical orientation so that step (d) is conducted with the faying surfaces of the first and second components disposed substantially vertical.

Fluidisation of the powder in step (c) may be accomplished by sonic, e.g. ultrasonic, agitation of the powder, for example by means of contact or non-contact sonic transducers coupled to the first component or to the containment device. For example, fluidisation may be achieved by pulsed application of at least one power beam or electromagnetic sonic vibrator).

The second component may be aligned with respect to the first component during step (d) by means of a fixture that enables accurate guidance of the second component with respect to the first component. The speed of displacement of the second component with respect to the first component in step (d) may be relatively slow, for example not greater than 1 mm/s, and possibly approximately 0.5 mm/s.

The consolidation process of step (e) may comprise the application of heat to the second component, for example to a flat surface of the second component that is parallel to the faying surface of the second component. After the consolidation process, the joined components may be cooled at a slow cooling rate, for example a rate not greater than 10° C./min, and possibly of the order of 5° C./min.

After step (e), it may be necessary to perform further operations on the joined components and on the consolidated powder. For example, the second component and/or the consolidated powder may require machining to match the profile of the original aerofoil.

In an embodiment in accordance with the present invention, the components are metallic components and may be made from alloys typically used in the aerospace industry, such as alloys based on titanium, nickel, aluminium or steel. It is envisaged that the method of the present invention could be successfully employed with components made from alpha, alpha+beta (Ti6-4, Ti6242, Ti6246, Ti550), beta alloy (Burn Resistant Titanium—BurTi) and titanium based intermetallic alloys (gamma titanium aluminides/Ti$_3$Al) and may be applicable to all refractory superalloys.

The sinterable powder may comprise particles of the same material as the first and second components or, where the first and second components are made from different materials, as at least one of them.

While one application of a method in accordance with the present invention is in the repair or regeneration of damaged aerofoils of a blisk structure, the method may be employed in the repair or original equipment manufacture of other gas turbine engine components or of components of assemblies other than gas turbine engines.

It is also possible for a method in accordance with the present invention to be employed in the manufacture or repair of non-metallic structures, in which the first and second components, and the powder, are made from ceramic or composite materials.

BRIEF DESCRIPTION OF THE DRAWINGS

For a better understanding of the present invention, and to show more clearly how it may be carried into effect, reference will now be made, by way of example, to the accompanying drawings, in which:

FIG. 1 is a diagrammatic perspective view of part of an integrally bladed rotor assembly or blisk;

FIG. 2 shows two components to be joined;

FIG. 3 shows the components in a different orientation;

DETAILED DESCRIPTION OF EMBODIMENTS

Figure 4:
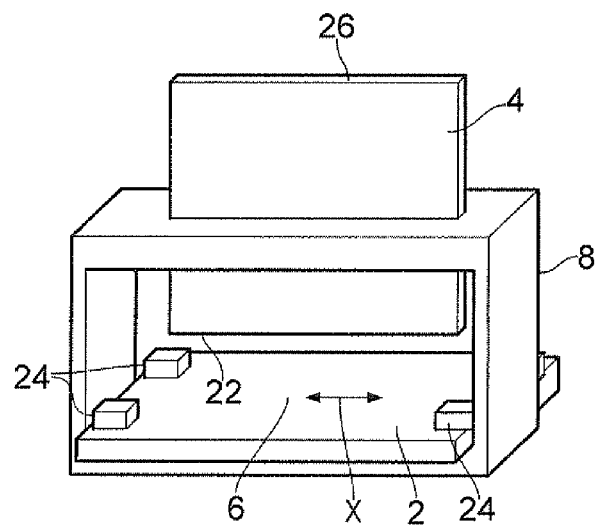
FIG. 4 shows the components of FIG. 2 supported in a fixture.

The blisk 10 represented in FIG. 1 may be used in the compressor or turbine of a gas turbine aero engine. The blisk 10 has a plurality of blades 12 integrally attached to a disc 14 so as to extend radially outwardly therefrom. The blades 12 are typically of a titanium, nickel or steel alloy (a titanium 6-4 alloy commonly being used) and, during initial manufacture of the blisk, may be attached to the disc 14 by linear friction welding.

During the life of the blisk 10, it is not uncommon for a single blade 12A to become significantly damaged and to require complete or partial replacement. To replace the blade 12A, or a damaged part of it, a new blade or patch part has to be attached. The damaged blade 12A or part is removed so as to provide a faying surface 6 (FIG. 5) to which the replacement blade or patch part is bonded.

FIG. 2 shows, in schematic form, a first component 2 and a second component 4. As represented in FIG. 2, the components 2, 4 are flat plates. In a practical embodiment the first component 2 may be the hub of the blisk 10 of FIG. 1, and the blisk 10 may include a stub 18. The second component 4 thus represents a patch part in the form of a replacement blade to be joined to the hub 2 as a replacement for the blade 12A, or part of that blade, which has been broken off the hub 2. The hub 2 has, in reality, an arcuate upper surface (with respect to the orientation shown in FIG. 2).

Thus, as a first step of the repair method, the damaged segment of the aerofoil 12A is removed, for example by CNC machining, to provide a faying surface 6 (FIG. 5) having a surface finish of approximately 1 micron Ra. The faying surface 6 is cleaned by a suitable process, such as localised etching using a HF+HNO$_3$ based reagent (for titanium alloys), followed by acetone.

The blisk 10 and the patch part 4 are placed in an outer chamber that is evacuated or filled with an inert gas. The patch part 4 is supported accurately with respect to the hub 2 by means of a fixture 8, as shown in FIG. 4. It will be appreciated that the arrangement is shown only diagrammatically in FIG. 4. The patch part 4 is spaced from the faying surface 6 of the hub 2. An inner enclosure (not shown) such as a canister, sheath, shroud or bag encloses the patch part 4, the fixture 8 and the region of the hub 2 containing the faying surface 6. The inner enclosure, like the outer chamber containing the entire blisk 2, is either evacuated or filled with an inert gas to ensure minimised oxygen content. The inert gas may, for example, be argon, and should be of high purity. The purpose of evacuating the enclosures, or filling them with inert gas, is to prevent oxidation of the various components during the following process.

Figures 5, 6, 7:
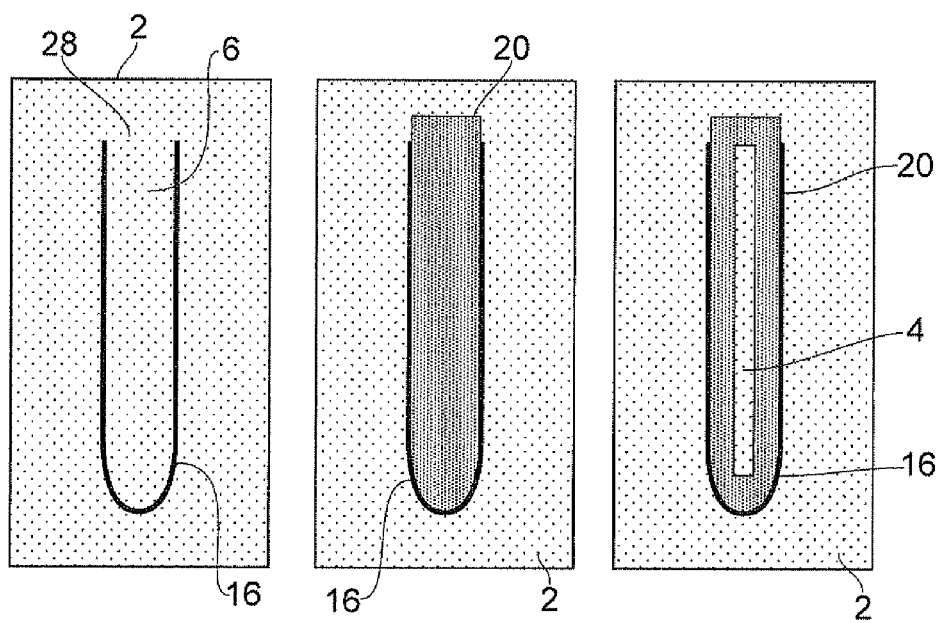
FIGS. 5 to 7 show three stages in a process of joining the components.

Referring to FIG. 5, a containment device in the form of a conforming receptacle 16 is placed on the hub 2 to enclose the faying surface 6. The receptacle 16 is accurately formed to have an internal contour that is complementary to the profile of the blades 12. The receptacle 16 will thus conform to the profile of the stub 18 and will extend above the stub, conforming to the profile of the patch part 4, which conforms to the periphery of the component joint area without flexing into the space between the patch part 4 and the faying surface 6.

The receptacle 16 may be made from a polymeric material such as that available under the designation MICROSET® 101.

As shown in FIG. 6, a sinterable powder 20 is introduced into the receptacle 16 and builds up on the faying surface 6 within the receptacle 16. The powder may be carried into the receptacle as a suspension in a flow of inert gas, or in a volatile liquid that can subsequently readily be evaporated. Alternatively, the powder may be mechanically dispensed into the receptacle 16. Thus, any suitable means could be employed for delivering the powder to the receptacle 16. For example, delivery could be achieved by a low velocity cold gas dynamic spray, or the powder 20 could be delivered through a feed pipe from a crucible containing sonic or sonic oscillating powder.

In a practical embodiment in accordance with the invention, the powder has the same nominal chemical composition as the first and second components 2, 4. The powder may be manufactured by any suitable process, for example by gas atomisation. The particles of the powder may be spheroidal with a particle diameter not less than 10 microns and not more than 50 microns. The particle size, or size distribution, should be consistent throughout the powder so as to assist fluidisation of the powder. A bi-modal powder size distribution may be utilised, i.e. the powder may consist of particle size fractions of two or more different mean sizes to increase the packing density of the powder, and so minimise void sizes. Fluidisation is assisted by minimising agglomerations of the particles, the extent of which can be assessed by laser size diffraction. Particle agglomeration can be minimised if a PREP (Plasma Rotating Electrode Process) powder is used.

It may be desirable for the powder 20 be introduced into the receptacle 16 with the faying surface 6 in one orientation, and then for subsequent steps of the process to be conducted with the faying surface 6 in a different orientation. For example, as shown in FIGS. 2 and 3, the first component 2 may be arranged such that the faying surface 6 is horizontal, as shown in FIG. 2, during introduction of the powder 20, and subsequently the first component 2 may be rotated such that the faying surface 6 is in a vertical orientation, as shown in FIG. 3, for the subsequent steps of the process. This measure can assist in ensuring adequate powder flow to all the regions of the faying surface 6, without agglomeration. Thus, by changing the orientation of the components, gravity can be used to assist powder flow. This can be particularly desirable if the components 2 and 4 have large cross-sectional areas at the faying surfaces. In some circumstances, orientations other than horizontal as shown in FIG. 2 and vertical as shown in FIG. 3 may be employed. For example, it may be desirable for the subsequent steps of the process to be carried out with the faying surfaces 6, 22 inclined at angles other than the horizontal and vertical orientations shown in FIGS. 2 and 3.

FIGS. 5, 6 and 7 show an open-ended receptacle 16, open at the top end, as viewed in FIGS. 5 to 7. This provides an opening 28 for the admission of the powder 20. In some variants of the process, the opening 28 may be closed, after the powder has been introduced, by a further receptacle component (not shown) to confine the powder 20 around the full extent of the joint. Prior to powder application, a rheological conformity assessment may be conducted to check on the flow characteristics of the powder and to ensure that it flows uniformly.

Following introduction of the powder 20, it is levelled to the top edge of the receptacle 16 by means of a levelling tool or powder placement/delivery device, linked to a vision system, or such as a roller or blade to ensure a uniform thickness of powder over the faying surface 6. In a particular embodiment, a powder thickness of about 1150 microns to 1500 microns is desirable.

The patch part 4 is then offered to the hub 2. As mentioned above, the patch part 4 is supported in the fixture 8, which serves as an alignment frame to ensure accurate guidance of the patch part 4 towards the faying surface 6. The corresponding faying surface 22 (FIG. 4) of the patch part 4 is maintained by the fixture 8 precisely parallel to the faying surface 6 of the hub 2. The patch part 4 is advanced towards the hub 2 with minimal pressure. The powder 20 is agitated by means of a suitable agitation device, such as piezo-electrical ultrasonic transducers 24 (FIG. 4). The transducers 24 are applied to the hub 2, at positions close to the faying surface 6. The frequency and amplitude of the displacements created by the transducers 24 are tuned to the flow characteristics of the powder morphology and to the joint geometry size and orientation. Tuning of the transducers 24 can be achieved by, for example, an optical based closed-loop feedback process control system, including an appropriate algorithm to apply appropriate vibration parameters for the particular powder being used.

The transducers are disposed in repeatable, defined positions on the assembly. In FIG. 4, the transducers are shown mounted on the hub 2, but they could be provided on suitable land features provided on flanks of the receptacle 16 using a non-abrasive coupling media. It is desirable for the transducers to be positioned as close as possible to the location of the joint between the components 2 and 4.

Upon contact with the levelled surface of the powder 20, the patch part 4 is advanced at a relatively slow rate, for example of the order of 0.5 mm/s, over a distance of approximately 1 mm. This causes the agitated powder to be uniaxially compressed so that it is deformed in a fluid state. The powder is compressed between the faying surface 6 of the hub 2 and the faying surface 22 of the patch part 4 to achieve a high density packed powder 20 in a bonding region between the hub 2 and the patch part 4. The powder conforms closely to the faying surfaces 6, 22 without significant change in the axial alignment of the components. The compressed powder thus maintains a consistent thickness over the bonding region Once compaction is complete, the receptacle 16 and the ultrasonic probes 24 are removed, and heat is applied to the patch part 4, for example at a flat surface 26 away from the faying surface 22, while maintaining pressure on the powder 20 between the faying surfaces 6, 22. The heat may be applied by any suitable means, and heat transfer is monitored, for example by means of thermocouples or pyrometry placed at suitable locations on the patch part 4 and the hub 2.

By applying the main heat to the powder 20 indirectly through the patch part 4, it is possible to avoid over-heating the powder 20 which could result in alpha-case generation on the powder particles. Also, thermal intrusion to the surrounding blades 12 can be minimised. During this heating stage, the powder is heated to a process temperature of approximately 300° C. (for titanium) to enable plastic deformation of the powder particles under the applied pressure. This plastic deformation can be assisted by preheating the first and second components 2, 4 and the powder 20, to a temperature below the process temperature. Such preheating, particularly preheating of the powder 20, aids conformance of the powder to the faying surface 6, 22 by creep deformation.

By applying the heat to the flat surface 26, where the patch part 4 has a relatively simple geometry, such as cuboidal, as shown in FIG. 4, a uniform heating rate and thermal distribution can be achieved, leading to uniform properties in the joint formed by the powder 20.

Final sintering of the powder 20 is achieved in a further application of uniaxial pressure, conducted under conditions that ensure that the faying surfaces 6 and 22 remain parallel, so that a uniform thickness of the powder 20 is achieved in the bonding region. The temperature at the bonding region is raised so as to achieve full sintering of the powder both between the particles of the powder and between the powder and the faying surfaces 6, 22. Typical sintering conditions are a temperature in the range 850 to 1200° C., and an applied pressure of 10 to 100 MPa (for titanium).

The sintering process causes further deformation of the particles of the powder, and diffusion bonding between adjacent particles and between the particles and the hub 2 and the patch part 4. A small quantity of the powder 20 may be extruded from the bonding region leaving a residue along the edges of the joint that can be removed in a subsequent process.

After the sintering process, the components are allowed to cool relatively slowly, for example at a rate of approximately 5° C./minute, to minimise residual stresses in the region of the joint, and to avoid any requirement for subsequent heat treatment.

In many applications of the method, the patch part 4 will be somewhat oversized compared to the eventual geometry of the finished blade 12. Consequently, a final machining operation will be required to achieve the final aerofoil profile and, as mentioned above, to remove any powder residues extruded from the bonding region.

The process described above can be conducted manually or can be automated, at least partially.

For illustrative purposes, FIG. 7 shows the patch part 4 surrounded by the powder 20. It is envisaged that, in a practical process, the patch part 4 would be a relatively close fit in the receptacle 16, so that the powder 20 will be constrained within the bonding region between the faying surface 6 and 22.

The axis of oscillation created by the ultrasonic transducers 24 may be oriented in any direction to achieve optimum agitation of the powder 20. In one embodiment, the oscillation may take place along an axis X (FIG. 4) that is parallel to the faying surfaces 6, 22, and aligned with the chordal direction of the patch part 4.

The process described above provides a relatively simple and low-cost solution for repairing aerofoils with minimal distortion while maintaining excellent material properties. The resulting joints between the components 2, 4 may be as strong as the material of the components 2, 4 themselves. Although the invention has been described with reference to the repair of a blisk, the process can be applied to individual aerofoils that are connected to rotor discs or hubs by conventional mechanical means.

Use of a pure powder 20 without the use of a binder such as an organic binder results in joints of superior mechanical properties, since there is a reduced risk of contamination at the interfaces between the particles.

In the process described, the components 2 and 4, and the powder 20 have the same composition as each other. However, the process can be adapted to join together components of dissimilar materials, while maintaining control of the mechanical properties of the joint.

The process is particularly suitable for repairing components made from gamma titanium aluminides and other intermetallic compositions, which are currently difficult to repair by conventional welding processes.

The process thus provides a means of achieving high integrity repairs of expensive components, so minimising the overall lifecycle cost of the component. In some circumstances, the process can be employed with the blisk or other damaged component in situ, without requiring its removal from its operating environment.

It will be appreciated that various modifications to the process may be made while not departing from the scope of the present invention. The regions of the components 2, 4 around the joint may be encapsulated, with either vitreous or braze based encapsulation, so that the repair method may include a hot isostatic pressing process on the powder 20 to assist in the removal of porosity from the resulting joint. It may be desirable in some circumstances to retain the receptacle 16 in position during the application of heat and pressure to the joint, and consequently it may be desirable for the receptacle 16 to be made from a material that can withstand the process conditions. For example, a ceramic sheath, instead of the polymer receptacle 16 described, may be employed. The sheath, if compatible with the substrate materials at temperature, may be retained throughout bonding to provide additional constraint if required.

In the process described above, the faying surfaces 6, 22 have generally flat profiles. It is possible to adapt the profiles of the faying surfaces 6, 22 to suit the requirements of the joint, and to facilitate powder compaction and filling. In the process as described, the patch part 4 is displaced uniaxially towards the hub 2 and applies uniaxial pressure to the powder 20. In some circumstances, it may be desirable for there to be displacement between the components 2 and 4 along multiple axes either sequentially or concurrently. The relative displacement could comprise linear oscillation or circular or patterned movements.

It will be appreciated that the agitation of the powder could be achieved by any kind of driver instead of the piezo-electric ultrasonic transducers 24 described above. For example, electromagnetic acoustic transducers (EMATS) could be employed.

The invention claimed is:

1. A method of joining a first component and a second component, the method comprising:

(a) placing a containment device in contact with the first component so that a faying surface of the first component is exposed to an interior of the containment device;
(b) introducing a sinterable powder into the containment device so that the sinterable powder accumulates on the faying surface of the first component;
(c) agitating the sinterable powder to thereby fluidize the sinterable powder;
(d) displacing the first component and the second component relative to each other to move a faying surface of the second component and the faying surface of the first component towards each other within the containment device, to thereby compress the agitated sinterable powder in a fluidized state in a bonding region between the faying surface of the first component and the faying surface of the second component; and
(e) sintering the compressed sinterable powder to consolidate the sinterable powder in the bonding region to form a joint between the first component and the second component, wherein
the first component and the second component are displaced relative to each other while the sinterable powder is being agitated.

2. The method of claim 1, in which at least the faying surface of the first component and the faying surface of the second component are disposed during at least steps (b) to (e) in an enclosure which is evacuated or contains an inert gas.

3. The method of claim 1, in which the containment device conforms to a profile of at least one of the first component and the second component.

4. The method of claim 1, in which an orientation of the faying surface of the first component is changed after step (b) and before step (d).

5. The method of claim 4, in which the faying surface of the first component is moved from a horizontal orientation to a vertical orientation.

6. The method of claim 1, in which the sinterable powder is agitated in step (c) by sonic agitation.

7. The method of claim 1, wherein step (e) further comprises applying heat and pressure to the compressed sinterable powder.

8. The method of claim 7, in which the heat is applied to the second component and transferred through the second component to the compressed sinterable powder.

9. The method of claim 8, in which the heat is applied to a flat surface of the second component that is parallel to the faying surface of the second component.

10. The method of claim 1, in which, following step (e), the second component is machined to a desired final profile.

11. The method of claim 1, in which the first component and the second component are made from a metallic material.

12. The method of claim 1, in which the sinterable powder is made from a metallic material.

13. The method of claim 1, wherein steps (a) through (e) are performed for the repair of a component of a gas turbine engine.

14. The method of claim 13, wherein the component is a damaged blade of a blisk, the blisk comprising a plurality of blades integrally attached to a disc.

15. The method of claim 6, in which the sinterable powder is agitated in step (c) by ultrasonic agitation.

16. The method of claim 2, in which the enclosure is disposed in an outer chamber that is evacuated or contains an inert gas.

17. The method of claim 11, in which the metallic material is selected from the group consisting of a titanium alloy, a nickel alloy, an aluminium alloy, a steel and titanium intermediate alloy.

18. The method of claim 1, in which the step of agitating the sinterable powder includes tuning vibration parameters via a closed-loop feedback process control system.

19. The method of claim 18, in which a frequency and amplitude of vibration are tuned.

20. The method of claim 18, in which the vibration parameters include powder morphology, joint geometry and orientation.

21. The method of claim 1, in which the sinterable powder includes particle size fractions of two or more different mean sizes.

22. The method of claim 1, in which the step of agitating the sinterable powder includes agitating the sinterable powder to a consistent thickness.

23. The method of claim 1, wherein the step of sintering is performed at a temperature between about 850 degrees Celsius and about 1200 degrees Celsius and at a pressure between 10 MPa and 100 MPa.

\* \* \* \* \*